3,270,692
DOUGH CUTTING AND FORMING DEVICE
William F. Cummins, Sr., W. Lake Road, De Ruyter, N.Y.
Filed June 2, 1964, Ser. No. 372,036
8 Claims. (Cl. 107—68)

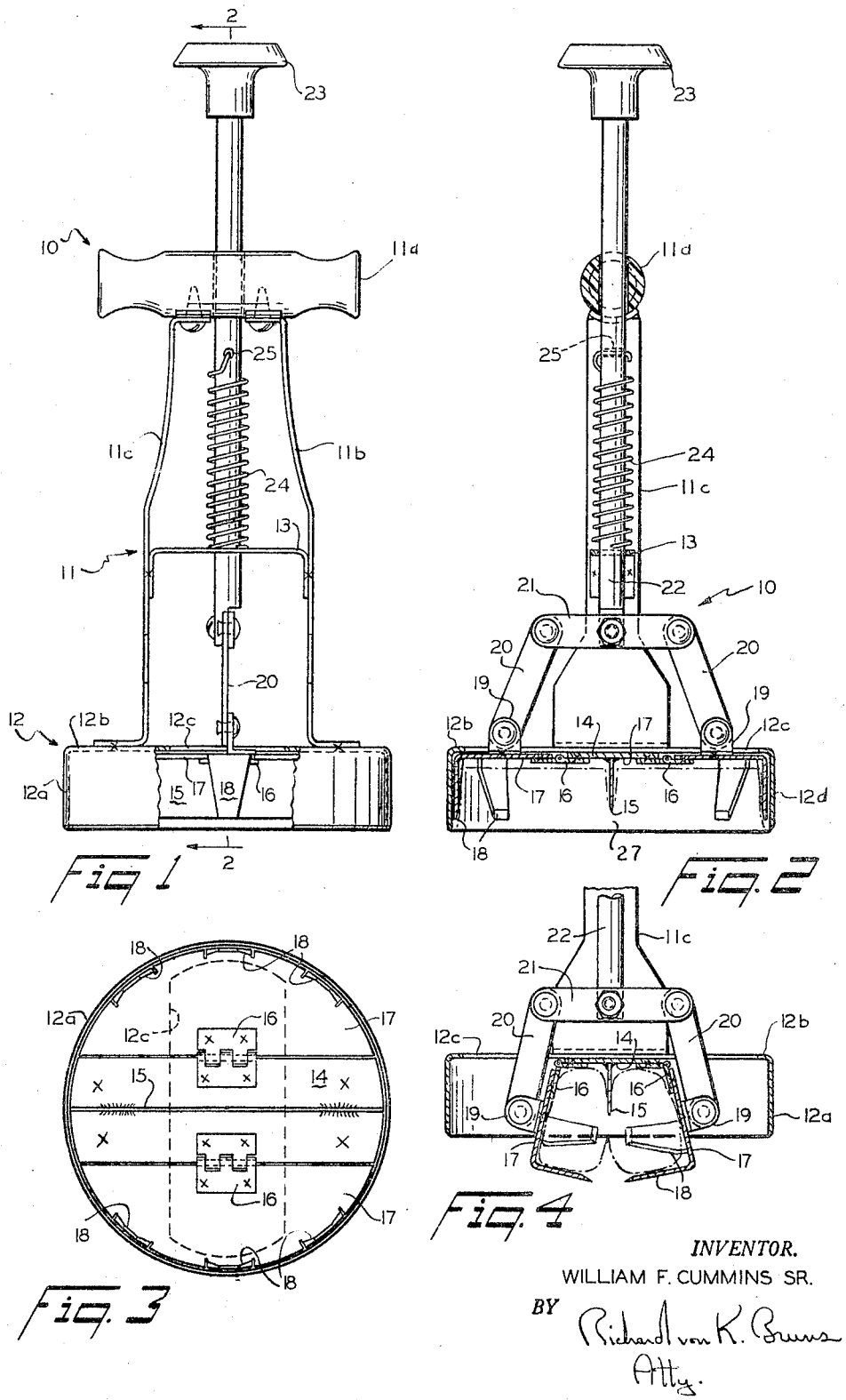

This invention relates to a kitchen device for cutting dough, and more particularly to a dough cutter for cutting a piece of dough from a sheet which has been rolled flat, folding the piece, and transferring the folded piece to a pan for baking.

In making rolls of the Parker House type or biscuit or cake confections folded over a condiment filling, it is usually necessary to fold a flat piece of dough over by hand after cutting the piece out of a flat sheet or after forming the piece by hand. Using the device of the present invention the dough is first rolled into a flat sheet, then a piece of dough of the desired configuration is cut from the sheet with the device, lifted and folded double, all in the same operation and while carried in the device, and then placed on baking sheet or pan. If filling is to be added, this can be done while the partially folded piece is held in the device before dropping it onto the baking surface.

The principal object of the invention, accordingly, is to provide a dough cutter which will cut out a piece of dough from a sheet which has been rolled flat, fold the piece over, lift the folded piece and transfer it to a baking pan all in continuous motion.

Another important object is to provide a dough cutter for cutting and folding Parker House type rolls in one operation.

Still another object is to provide a mechanical dough cutter and folded for filled baked goods which holds the folded dough while the filling is added.

Other objects and advantages will be apparent from the following description taken in conjunction with the accompanying drawing, in which:

FIGURE 1 is a side elevational view of a dough cutter according to the invention, a portion of the cutter side wall being broken away;

FIGURE 2 is a sectional view thereof on the line 2—2 of FIGURE 1;

FIGURE 3 is a bottom plan view thereof; and

FIGURE 4 is a fragmentary sectional view similar to FIGURE 2 showing the folding wings in extended position.

In the drawing a handle frame 11 includes a hand grip member 11a secured at the upper ends of a pair of frame side members 11b and 11c. The lower ends of the side members are welded to a tubular open-ended cutting shell or housing 12 and a cross brace 13 is secured in the frame between the two side members 11b and 11c.

The cutting shell 12 has a tubular side wall 12a sufficiently thin at its lower edge to cut through a rolled out sheet of dough in the usual manner. The top 12b of the shell is partially closed to provide means for attachment to the frame 11, but has a rectangular opening 12c therethrough for the operating members hereinafter described.

A flat knife support member 14 is secured, as by welding, to the top of the shell across the opening 12c, and a knife 15 is secured perpendicular to member 14 diametrically across the shell bisecting the interior thereof. The knife 15 extends down toward the open end of shell 12, its sharp lower end terminating above the cutting lower edge of the shell.

Swingably attached to each side edge of the member 14 by means of a hinge 16 is a flat wing member 17 having the shape of a segment of a circle. The wing members 17 are disposed across the shell just under its top 12b and extend from the member 14 to the curved shell wall 12a. Three rigid fingers 18 are bent down from each wing 17 at the curved perimeter thereof so as to normally extend alongside the shell wall 12a toward the open end of the shell as best seen in FIGURES 1 and 2.

Each wing 17 has an ear 19 secured to the top surface thereof by welding or otherwise and normally extending upward through the aperture 12c. Each ear 19 has a link 20 pivotally secured thereto, the upper end of each link being pivotally secured to an end of the crossbar 21 which is secured to the lower end of an operating rod 22. Rod 22 extends upward through suitable holes in cross brace 13 and hand grip 11a of the frame and terminates in a finger piece 23 above the grip. Rod 22 is slidable up and down in the frame 11 and is biased upward by a coil spring 24 therearound, one bent end of the spring passing through a suitable hole 25 in the rod and the other end resting against the cross brace 13 as shown. Rod 22 can be pushed down against spring 24 and the downward motion is transmitted through links 20 and ears 19 to the wings 17. The wings may thus be swung downward about the axes of hinges 16 to an extended position substantially parallel to knife 15 with the fingers 18 of the two wings extending toward one another as shown in FIGURE 4.

In operation, the bread or cake dough is first rolled flat, in the usual manner, into a sheet of dough about one-half inch thick. Grasping the hand grip 11a, the user punches out a round hole in the sheet, the side wall 12a of the shell cutting the dough in the usual manner. At the same time, the round disk of dough within shell 12 (indicated by broken lines in FIGURE 2) is partially bisected by the knife 15, the two halves of the partially bisected piece of dough being joined by an uncut portion 27 below the knife, as shown. When the wings 17 are in normal position, the wings, hinges 16 and support member 14 are all spaced from the open end of shell 12 a distance exceeding one-half inch so they do not come in contact with the dough. Fingers 18 normally lie along the shell wall 12a and enter in the cleavage made by the shell wall between the dough sheet and the cut-out piece.

As the cutter 10 is lifted from the board on which the sheet of dough lies, rod 22 is pushed downward by finger pressure on finger piece 23 and the wings 17 swing down to the extended position shown in FIGURE 4. The wings fold the piece of dough in shell 12 down on either side of the knife 15 and the fingers 18 hold the folded piece in the position indicated by broken lines in FIGURE 4.

The cutter may then be turned up-side-down and the protruding ends of the dough piece buttered for browning or a filling may be spooned or otherwise inserted between the folded portions of the dough piece held in the cutter. Thereafter, the folded piece of dough is released over a baking sheet or pan by releasing the pressure on the finger piece 23 and the shaped roll or confection is placed in the pan ready for baking.

Referring to the folded configuration of the cut-out and folded piece of dough indicated in broken lines in FIGURE 4 it will be understood that the two halves of the piece have been bent in the folding process. When the piece is released by the cutter 10 and dropped into the banking pan, preferably with the cleft portion shown at the bottom in FIGURE 4 disposed along one side, the bent dough straightens out and the cut caused by the knife 15 opens out and the portion cut by the knife becomes a substantially flat side of the dough in the pan opposite the folded cleft. Indentations caused by fingers 18 substantially disappear when the roll rises and is baked.

While the shape of the open end of the cutter shell or housing disclosed herein is round, it will be apparent that a cutter having a square or oblong or other symmetrical shape will be equally as effective, the folding wings being similarly shaped to conform.

As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. In a dough cutting and forming device, an open-ended shell having a sharp cutting edge defining its open end, a knife mounted transversely in said shell with its knife edge facing the open end thereof, a wing member swingably mounted in the shell on each side of said knife and movable about an axis parallel to the knife from a normal position across the shell to an extended position substantially parallel to the knife, each wing having dough gripping means thereon, said means being disposed alongside the shell wall when the wings are in normal position and directed toward said knife when the wings are in extended position, and means for moving said wings from normal to extended position.

2. In a dough cutter, a shell having an open end, a knife mounted transversely in said shell with its knife edge facing the open end thereof, a wing member swingably mounted in the shell on each side of said knife and movable from a normal position substantially perpendicular to the knife to an extended position substantially parallel to the knife each wing having dough gripping means thereon, and means for moving said wings from normal to extended position.

3. In a dough cutter, the combination of an open-ended shell of symmetrical outline, a knife secured therein dividing the shell in half, a flat wing hingedly secured in the shell on each side of the knife and movable about an axis parallel to the knife from a normal position across the shell to an extended position substantially parallel to the knife, each wing having a plurality of fingers about its perimeter opposite said axis, the fingers being disposed alongside the shell wall when the wings are in normal position and directed toward the knife when the wings are in extended position, and means for moving the wings from normal to extended position.

4. In a dough cutter, the combination of a frame having a handle at one end and a tubular housing at the other end, the housing sidewall having a sharp lower edge to cut a cylindrical opening in the dough, a knife secured diametrically across and within the housing, the knife having a sharp lower edge spaced above said housing lower edge, a wing member hingedly secured in the housing on either side of said knife, the hinge-axes being parallel to and spaced from the knife and being spaced from the housing lower edge, said wings normally extending across the housing and being movable about said axes down to an extended position parallel to the knife, and means mounted in the frame for moving the wings from normal to extended position for folding a piece of dough cut by the housing.

5. A cutting device for dough which has been rolled out to a substantially uniform thickness, comprising: an open-ended shell of symmetrical outline, a knife secured therein dividing the shell, the knife having a lower edge spaced above the lower end of the shell into halves, a flat wing swingably mounted in each half shell and disposed across the half shell when in normal position, each wing being movable about an axis spaced from said knife and from the open end of the shell a distance substantially equal to the dough thickness to an extended position substantially parallel to the knife, a plurality of rigid fingers disposed about the perimeter of each wing opposite said axis, the fingers projecting from the wing alongside the shell wall toward said open end when the wings are in normal position and extending toward the knife when the wings are in extended position, and means for moving the wings from normal to extended position for folding a piece of dough cut by the shell and the knife.

6. In a dough cutter, the combination of a housing having a thin-walled open-ended tubular portion for cutting a circular piece of dough, a knife secured diametrically across the housing and having a cutting edge spaced above the open end of the housing, a flat wing hingedly secured in the housing on either side of the knife, each wing having a hinge axis spaced from the knife and the housing open end, each wing being movable from a normal position in which the wing extends across the housing from its hinge axis to the housing wall to an extended position in which the wing extends out of the open end of the housing parallel to the knife, each wing having rigid fingers extending perpendicularly therefrom and alongside the housing tubular wall when the wing is in normal position, a handle secured to the housing, and means associated with the handle for moving the wings from normal to extended position for folding a piece of dough cut by the housing and knife.

7. A cutting and folding device for dough which has been rolled out to a substantially uniform predetermined thickness, comprising: a thin shell of symmetrical outline having a sharp open lower end, a knife secured therein bisecting the shell, the cutting edge of the knife being spaced above the open end of the shell a distance less than the dough thickness, a flat wing movably mounted in each half shell on a hinge axis spaced from said knfe, each wing being spring-biased to a normal position spaced from the open end of the shell a distance greater than the dough thickness, each wing when in normal position extending from said axis to an edge alongside the shell wall, a plurality of rigid dough-retaining fingers projecting from said edge toward the open end of the shell when the wings are in normal position, a frame having one end secured to the shell, a hand grip on the frame, a rod slidably mounted in the frame and having a fingerpiece at one end adjacent to the hand grip, a cross-piece secured on the other end of the rod, and a link pivotally secured at one end to each end of the cross-piece, the other end of each link being pivotally secured to a wing, whereby the fingerpiece may be depressed to move the wings against their spring-bias from normal position to an extended position substantially parallel to the knife for folding a piece of dough cut by the shell and knife.

8. A Parker House roll cutter and folder comprising: a tubular shell having a sharp edged sidewall at its open lower end for cutting a round piece of dough, a knife secured diametrically across the shell, the knife having a cutting edge spaced above said lower end for partially cutting through the dough cut by the shell, a rectangular hinge support secured across the top of the shell along the top of the knife, wing members hingedly secured to either side of the hinge support, the wing members normally extending across the top of the shell from the hinge support to the shell sidewall and having rigid fingers extending from the perimeter of the wings along the shell sidewall toward said lower end, said wing members being movable to an extended position projecting from the lower end of the shell, a frame secured to the top of the shell, a hand grip at the end of the frame, a rod slidably mounted in the frame and having a fingerpiece at one end adjacent the hand grip, a cross-member secured to the other end of the rod, link members pivotally connected at one end to each end of the cross-member, the other end of each link member being pivotally connected to a wing member, and a spring associated with the frame and the rod for biasing the wiring members to normal position.

References Cited by the Examiner

UNITED STATES PATENTS 2,573,708  11/1951  Hall _____ 107—9
2,754,587  7/1956  Bylkas _____ 107—47 X WALTER A. SCHEEL, *Primary Examiner.*